United States Patent [19]

Uchikawa

[11] Patent Number: 5,582,157

[45] Date of Patent: Dec. 10, 1996

[54] FUEL PROPERTY DETECTING APPARATUS FOR INTERNAL COMBUSTION ENGINES

[75] Inventor: Akira Uchikawa, Atsugi, Japan

[73] Assignee: Unisia Jecs Corporation, Atsugi, Japan

[21] Appl. No.: 530,234

[22] PCT Filed: Feb. 24, 1995

[86] PCT No.: PCT/JP95/00275

§ 371 Date: Oct. 6, 1995

§ 102(e) Date: Oct. 6, 1995

[87] PCT Pub. No.: WO95/23284

PCT Pub. Date: Aug. 31, 1995

[30] Foreign Application Priority Data

Feb. 25, 1994 [JP] Japan .................. 6-027750

[51] Int. Cl.$^6$ ............................. F02D 41/14
[52] U.S. Cl. ................. 123/676; 123/689; 73/116
[58] Field of Search ................. 123/425, 435, 123/491, 676, 685, 686, 689, 680; 73/116, 35

[56] References Cited

U.S. PATENT DOCUMENTS

| | | | |
|---|---|---|---|
| 5,115,780 | 5/1992 | Jonsson et al. | 123/676 |
| 5,191,689 | 3/1993 | Kamioka et al. | 123/494 |
| 5,197,450 | 3/1993 | Kitajima et al. | 123/685 |
| 5,322,047 | 6/1994 | Oliu et al. | 123/676 |
| 5,363,314 | 11/1994 | Kobayashi et al. | 364/497 |
| 5,419,296 | 5/1995 | Yamaura | 123/435 |
| 5,469,831 | 11/1995 | Takahashi | 123/680 |
| 5,492,101 | 2/1996 | Saito et al. | 123/491 |
| 5,499,607 | 3/1996 | Tomisawa | 123/435 |

FOREIGN PATENT DOCUMENTS

| | | |
|---|---|---|
| 4-58029 | 4/1992 | Japan . |
| 4-191450 | 4/1992 | Japan . |
| 4-58051 | 4/1992 | Japan . |
| 4-259639 | 4/1992 | Japan . |
| 5-195840 | 8/1993 | Japan . |

*Primary Examiner*—Willis R. Wolfe
*Attorney, Agent, or Firm*—Foley & Lardner

[57] ABSTRACT

Provided is an apparatus for detecting a volatility of fuel supplied to an engine, in order to ensure a more precise acceleration dependent fuel increasing-correction during air-fuel-ratio feed-back control. When the air-fuel-ratio feed-back control begins after engine starting (S4), a determination is made as to whether the engine is in a low exhaust-temperature state on the basis of an engine coolant temperature Tw (S5). When the exhaust temperature is low, an average value $\alpha_{av}$ of an air-fuel-ratio feed-back correction factor $\alpha$ is derived (S6, S7), and then the average value $\alpha_{av}$ is compared with a reference value (S8). In case that the fuel supplied to the engine is a heavy-gravity fuel of a low volatility, since there are great amounts of hydrocarbons HC in exhaust gases and with a great consumption of oxygen a control point of the air-fuel-ratio feed-back control, which point can be indicated by the average value $\alpha_{av}$, shifts to a leaner side. On the basis of the shift of the control point to the leaner side, during the air-fuel-ratio feed-back control, a discrimination is made as to whether the fuel supplied to the engine is a heavy-gravity fuel of a low volatility or a light-gravity fuel of a high volatility (S9, S10).

6 Claims, 4 Drawing Sheets

FUEL PROPERTY DETECTING APPARATUS FOR INTERNAL COMBUSTION ENGINES

TECHNICAL FIELD

The present invention relates to an apparatus and method for detecting a property of fuel supplied to an internal combustion engine, and specifically to an apparatus and method for detecting a volatility of fuel consumed in the engine to determine as to whether the fuel is a heavy-gravity fuel or a light-gravity fuel.

BACKGROUND ART

In conventional electronically controlled fuel injecting device for internal combustion engines, the amount of fuel supplied to the engine would be increasingly corrected in consideration of deterioration of the fuel volatility during cold-engine operation or in consideration of a transiently increased amount of fuel adhered onto the inner wall surface of the intake passage (the increased flow rate of fuel flowing along the inner wall surface) during accelerating operation.

The requirement for increasing correction of fuel supply is different depending on the degree of the fuel volatility, that is, the degree to which the fuel is heavy or light. In case of heavier gravity fuel of a lower volatility, there is a great requirement for increasing correction of fuel supply. In general, it is difficult to perfectly maintain the degree of the fuel volatility, namely the degree to which the fuel is heavy or light, at a constant value. At least in case of heavy-gravity fuel used for the engine, in the conventional electronically controlled fuel injecting device, a characteristic necessary for the fuel-supply increasing correction suitable for heavy-gravity fuel would be preset, so as to satisfy the requirement for increasing correction of fuel supply.

However, under a condition in which the fuel-supply increasing-correction characteristic suitable for heavy-gravity fuel is held constant, if the characteristic for heavy-gravity fuel is applied to light-gravity fuel in case of which there is almost no necessity of increasing correction of fuel supply, there is a tendency of excessive increasing correction of fuel supply, thereby resulting in an excessively rich air-fuel ratio. As a result, unburned hydrocarbons (HC) contained in the exhaust gases tend to increase. Thus, it is desired that the level of increasing correction of fuel supply is suitably varied depending on the volatility of fuel supplied to the engine. For the reasons set forth above, it is necessary to detect a volatility (heavier-gravity or lighter-gravity) of fuel supplied to the engine.

One such technology, in which the level of increasing correction of fuel supply is corrected to a proper level based on the fuel volatility, has been disclosed in Japanese Patent Provisional Publication (Tokkai Heisei) No. 5-195840.

In the above-mentioned Publication, torque fluctuations in an internal combustion engine, resulting from surge, is monitored and the amount of increasing-correction of fuel is gradually decreased depending on the monitored torque fluctuations (surge torque fluctuations), and thus the increasing-correction amount is controlled so that the surge torque does not exceed an acceptable level. As a consequence, the increasing-correction amount of fuel is provided in a manner so as to conform to the fuel volatility.

However, in case of the method of fuel-supply correction described in the above-noted Publication, since the amount of increasing-correction is decreasingly adjusted gradually, it takes a long time until a desired increasing-correction level, serving as a parameter indicative of a fuel volatility, has been reached. Additionally, since the air-fuel ratio is forcibly varied through a feed-back control, i.e., a closed-loop control of an air-fuel ratio, in the event that the air-fuel ratio feed-back control begins, the fuel volatility cannot be detected during the feed-back control.

The prior-art apparatus suffers from the drawback that the level of increasing-correction of fuel supply, achieved during acceleration, cannot be satisfactorily in conformity with the fuel volatility, in the case that the air-fuel ratio feed-back control is executed soon just after the engine starts, by providing a heater nearby an $O_2$ sensor used for detecting an air-fuel ratio, so as to improve exhaust-emission control characteristics, for example.

The present invention is made in view of the fact that a detected characteristic of a concentration of oxygen ($O_2$) is affected by a concentration of hydrocarbon (HC). It is, therefore, in view of the above disadvantages, an object of the present invention to provide an apparatus which is capable of detecting a property of fuel, while executing a feed-back control for an air-fuel ratio.

DISCLOSURE OF INVENTION

The fuel-property detecting apparatus for an internal combustion engine, made according to the invention, is constructed as shown in FIG. 1.

In FIG. 1, an oxygen-concentration detection means 101 is provided to detect a concentration of oxygen contained in exhaust gases discharged from the engine. An air-fuel-ratio feed-back control means 102 is provided to set an air-fuel-ratio feed-back correction factor so that an air-fuel ratio of the incoming air-fuel mixture is adjusted toward a target air-fuel ratio, on the basis of the concentration of oxygen detected by the oxygen-concentration detection means 101, and to correct an amount of fuel delivery achieved through a fuel-supply means 103 in accordance with the air-fuel-ratio feed-back correction factor.

On the other hand, a low exhaust-temperature state detection means 104 is provided to detect as to whether or not an exhaust-temperature of the engine is in a predetermined low exhaust-temperature state.

Also provided is a fuel-property discrimination means 105 is provided to discriminate a volatility of fuel supplied to the engine on the basis of the air-fuel-ratio feed-back correction factor set by the air-fuel-ratio feed-back control means 102, when detecting that the exhaust-temperature is in the predetermined low exhaust-temperature state by means of the low exhaust-temperature state detection means 104.

According to the fuel-property detecting apparatus of the present invention, the closed loop control for the air-fuel ratio, that is, the air-fuel-ratio feed-back control is executed on the basis of the concentration of oxygen contained in the exhaust gases discharged from the engine. When the air-fuel-ratio feed-back control is executed in the predetermined low exhaust-temperature state, namely at the beginning of the air-fuel-ratio feed-back control executed just after the engine starts, the fuel volatility is discriminated on the basis of the air-fuel-ratio feed-back correction factor.

The characteristic of the detected concentration of oxygen generally tends to vary owing to the concentration of unburned components, that is, hydrocarbons (HC). Concretely, in case that there are great amounts of hydrocarbons (HC) in the atmosphere in the vicinity of the oxygen-concentration detection means 101, there is a tendency for a richer zone (a lower concentration of oxygen) of the air-fuel ratio to become increased by way of oxidation reaction of hydrocarbons (HC). In this case, the air-fuel mixtures are adjusted toward leaner mixtures by way of the air-fuel-ratio feed-back control, in comparison of less amounts of hydrocarbons (HC).

Ordinarily, the amount of hydrocarbons (HC) discharged from the combustion chambers tends to increase, as the fuel volatility deteriorates. Therefore, the control point of the air-fuel-ratio feed-back control tends to be shifted toward a leaner side, as the volatility deteriorates. By utilizing such a characteristic, the fuel volatility can be estimated on the basis of the air-fuel-ratio feed-back correction factor.

However, under a condition of a high exhaust-temperature, since combustion of hydrocarbons (HC) tends to be promoted in the exhaust system, the fuel volatility variations cannot be remarkably indicated by variations in the amount of hydrocarbons in the atmosphere in the vicinity of the oxygen-concentration detection means 101. For the above-noted reasons, it is necessary to perform the detection of the fuel volatility based on the air-fuel-ratio feed-back correction factor, under a particular condition in which the exhaust-temperature is low.

In the apparatus as claimed in claim 2, the fuel-property discrimination means 105 is constructed to discriminate that the fuel volatility is either one of two kinds of volatilities, namely a good volatility (a high volatility) and a bad volatility (a low volatility), by comparing the air-fuel-ratio feed-back correction factor with a predetermined reference value.

In the apparatus made according to the invention defined in claim 2, the fuel volatility is discriminated between the good volatility and the bad volatility, on the basis of the comparison result of the air-fuel-ratio feed-back correction factor and its predetermined reference value. That is to say, the above-mentioned predetermined reference value corresponds to a reference volatility. For instance, in case that the actual fuel volatility is lower than the reference volatility, the air-fuel-ratio feed-back correction factor is set at a leaner-mixture control point than the reference value, and thus the apparatus determines that the fuel of a lower volatility than the reference volatility, i.e., the fuel of a bad volatility is delivered to the engine. In contrast to the above, in case that the air-fuel-ratio feed-back correction factor is set at a richer-mixture control point than the reference value, the apparatus determines that the fuel of a higher volatility than the reference volatility, i.e., the fuel of a good volatility is delivered to the engine.

In the apparatus made according to the invention, for the purpose detecting an offset value of the air-fuel-ratio feed-back correction factor, offsetting from the reference value, an average value of the air-fuel-ratio feed-back correction factors may be calculated and utilized. In this case, the fuel volatility can be discriminated on the basis of the average value.

To avoid that any other factors except fuel volatility have a bad influence on variations in the air-fuel-ratio feed-back correction factor, the apparatus of the invention may include means for learning the average value of the air-fuel-ratio feedback correction factors set when the exhaust-temperature is high, and means for setting a reference value used for discrimination of the fuel volatility on the basis of the learnt average value.

In order to optimize the air-fuel ratio during transition of engine operation, the apparatus according to the invention may include means for correcting the amount of increasing correction of fuel to be added to the reference fuel-delivery amount, on the basis of the fuel volatility detected.

BEST MODE FOR CARRYING OUT THE INVENTION

Figure 1:
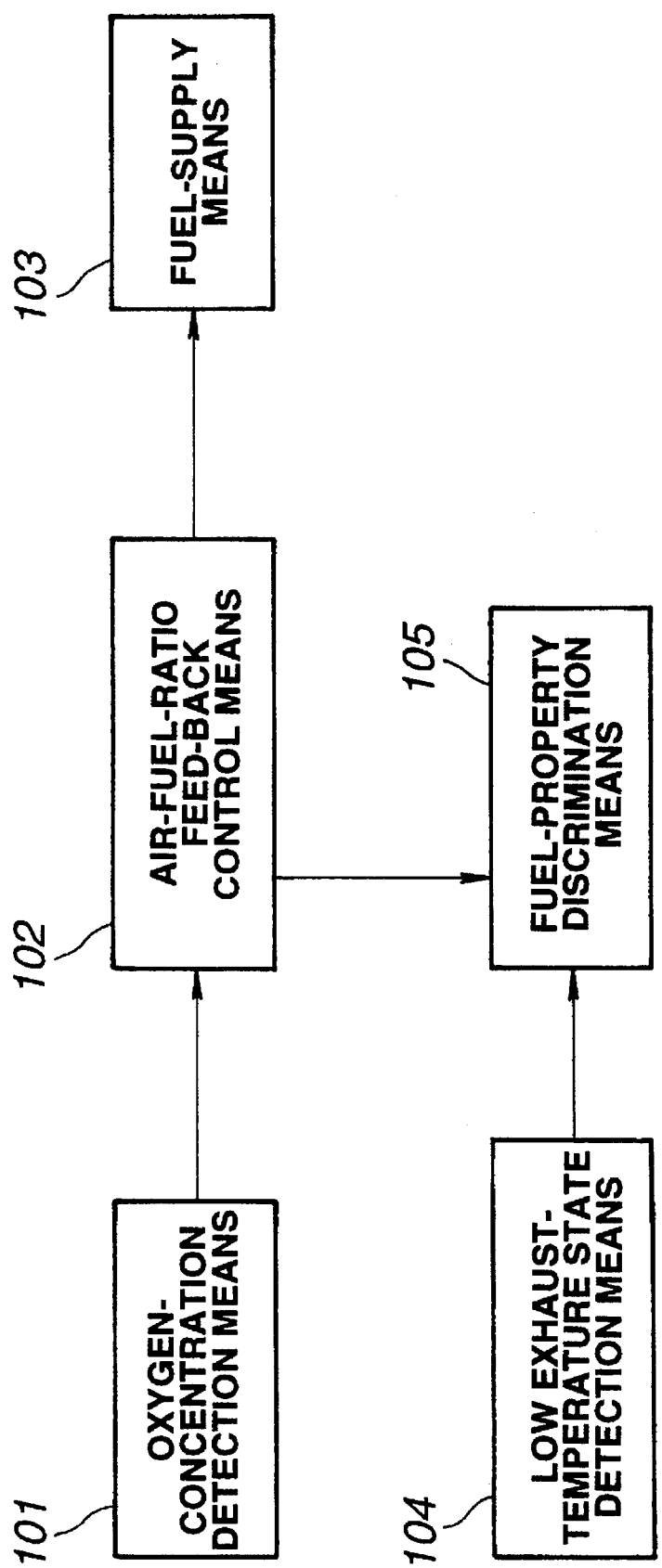
FIG. 1 is a block diagram illustrating a basic construction of the present invention.

The present invention will be hereinbelow described in detail on the basis of the embodiment shown in the drawings attached hereto.

Figure 2:
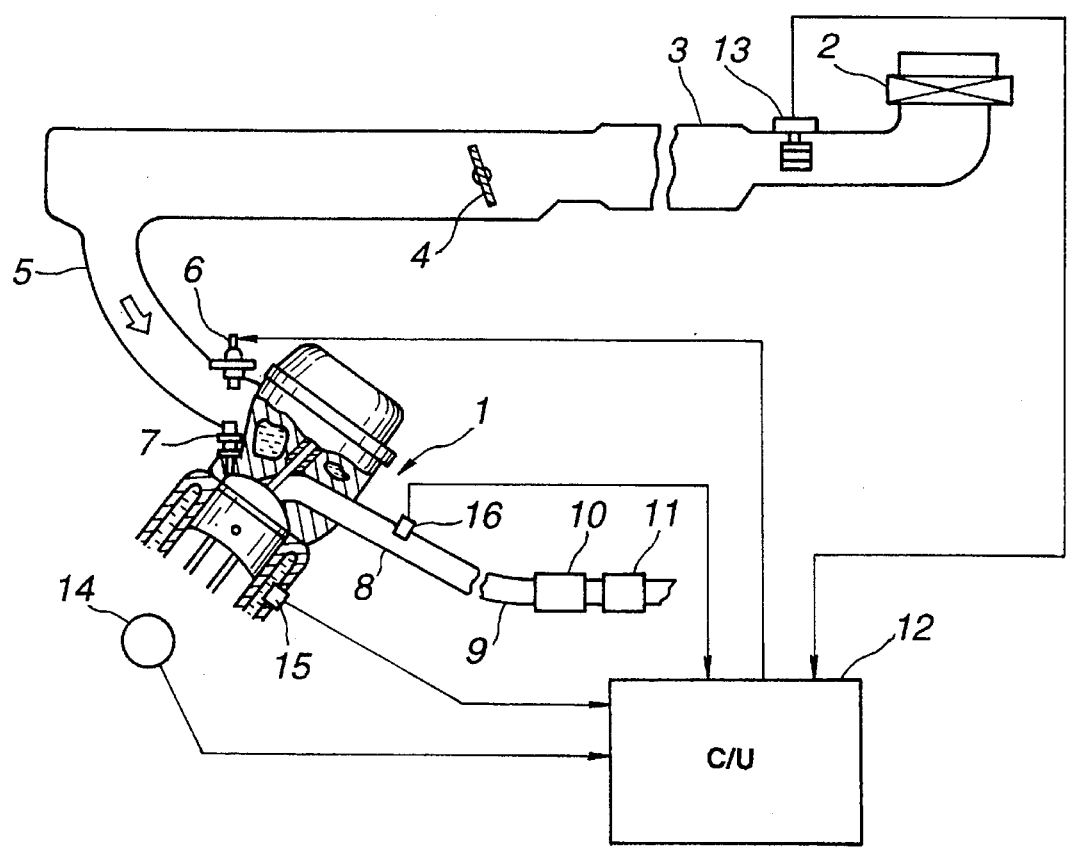
FIG. 2 is a schematic diagram illustrating a construction of one embodiment of the apparatus of the invention.

Referring now to FIG. 2, there is shown a preferred embodiment according to the invention. In FIG. 2, an internal combustion engine 1 is an internal combustion engine for an automotive vehicle which uses as fuel such as gasoline. In the internal combustion engine 1, air is introduced from an air cleaner 2 through an air-intake duct 3, a throttle 4, and an intake manifold 5. Fuel-injection valves 6 are provided at respective branch pipes of the intake manifold 5, for feeding fuel into each engine cylinder by way of fuel-injection.

Each fuel-injection valve 6 is comprised of an electromagnetic fuel-injection valve which is opened when its solenoid is energized and closed when the solenoid is de-energized. The opening and closing action of the valve is controlled in response to a drive pulse signal generated from a control unit 12 as explained later. Introduced into the fuel-injection valve 6 is fuel which is pumped by a fuel pump (not shown) and regulated at a predetermined pressure level by means of a pressure regulator. When the fuel-injection valve 6 is cyclically opened, the fuel is intermittently injected and supplied into the engine 1.

Spark plugs 7 are provided in the respective combustion chambers of the engine 1, for firing and burning air-fuel mixtures in the cylinders by way of spark ignition. Then, exhaust gases are exhausted from the engine 1 through an exhaust manifold 8, an exhaust duct 9, a three-way catalytic converter 10 and a muffler 11.

The control unit 12 which unit is provided for an electronical control for fuel delivery to the engine 1, is constructed as a microcomputer system including a central processing unit (CPU), a read only memory (ROM), a random access memory (RAM), an analog-to-digital converter (A/D converter), and input and output interfaces and the like. The control unit receives input signals from various sensors, and executes a predetermined arithmetic processing as described later, and also controls the operation of the respective fuel-injection valves 6.

Provided as one of the above-noted sensors is an air-flow meter 13 disposed in the air-intake duct 3, for the purpose of producing a signal indicative of a flow rate Q of air introduced into the engine 1.

Also provided is a crank-angle sensor 14 which generates a reference-angle indicative signal REF every reference angular position for example a top dead center generally abbreviated to TDC and additionally generates a unit-angle indicative signal POS every unit angle such as 1° or 2°. With this arrangement, an engine revolution speed Ne can be derived and calculated by measuring a time period of the reference-angle indicative signal REF or the number of occurrence of the unit-angle indicative signals POS for an unit hour.

An engine coolant temperature sensor 15 is provided for detecting a temperature Tw of coolant in the water jacket of the engine 1.

Also provided in the confluent portion of the exhaust manifold 8, is an $O_2$ sensor for detecting a concentration of oxygen in exhaust gases.

The $O_2$ sensor is comprised of a well-known zirconia-tube type oxygen concentration cell. The concentration cell has a pair of platinum electrodes on inside and outside wall surfaces of its zirconia tube. The concentration cell is so designed to output an electromotive force, which force is produced in responsive to a ratio between a concentration of oxygen in a reference gas (the atmosphere) prevailing in the inside wall region of the zirconia tube and a concentration of oxygen in the exhaust gases flowing along the outside wall region of the zirconia tube, as an oxygen-concentration indicative signal, by the aid of the platinum electrodes.

In order to be able to execute the air-fuel-ratio feed-back control based on the signal from the $O_2$ sensor 16 as early as possible, just after the engine starts, it is preferable that the $O_2$ sensor 16 accommodates therein a heater.

The CPU of the microcomputer accommodated in the control unit 12 operates to derive an amount Ti of fuel-injection of the fuel-injection valve 6 from the following expression.

$$Ti < Tp \times CO \times \alpha + Ts$$

where the character Tp denotes a reference fuel-injection amount (a reference injection pulse-width) calculated as a function of the flow rate Q of the introduced air and the engine revolution speed Ne, the character CO denotes a correction coefficient based on various factors, including a basic increasing-correction factor based on the engine coolant temperature Tw, an engine-starting dependent increasing-correction factor required just after the engine starts, and an acceleration dependent increasing-correction factor required during acceleration, the character $\alpha$ denotes the air-fuel-ratio feed-back correction factor required for correction of the reference fuel-injection amount Tp so that the air-fuel ratio detected by the $O_2$ sensor 16 is adjusted to a stoichiometric air-fuel ratio (the target air-fuel ratio), the feed-back correction factor $\alpha$ being set by way of a proportional integral control (PI) based on the air-fuel ratio detected, and additionally the initial value of the air-fuel-ratio feed-back correction factor $\alpha$ being set at "1.0", and the character Ts denotes a voltage-fluctuation dependent correction factor required for correction of changes in a reactive injection-time period of the fuel-injection valve 6, the changes being created owing to voltage fluctuations.

Figure 3:
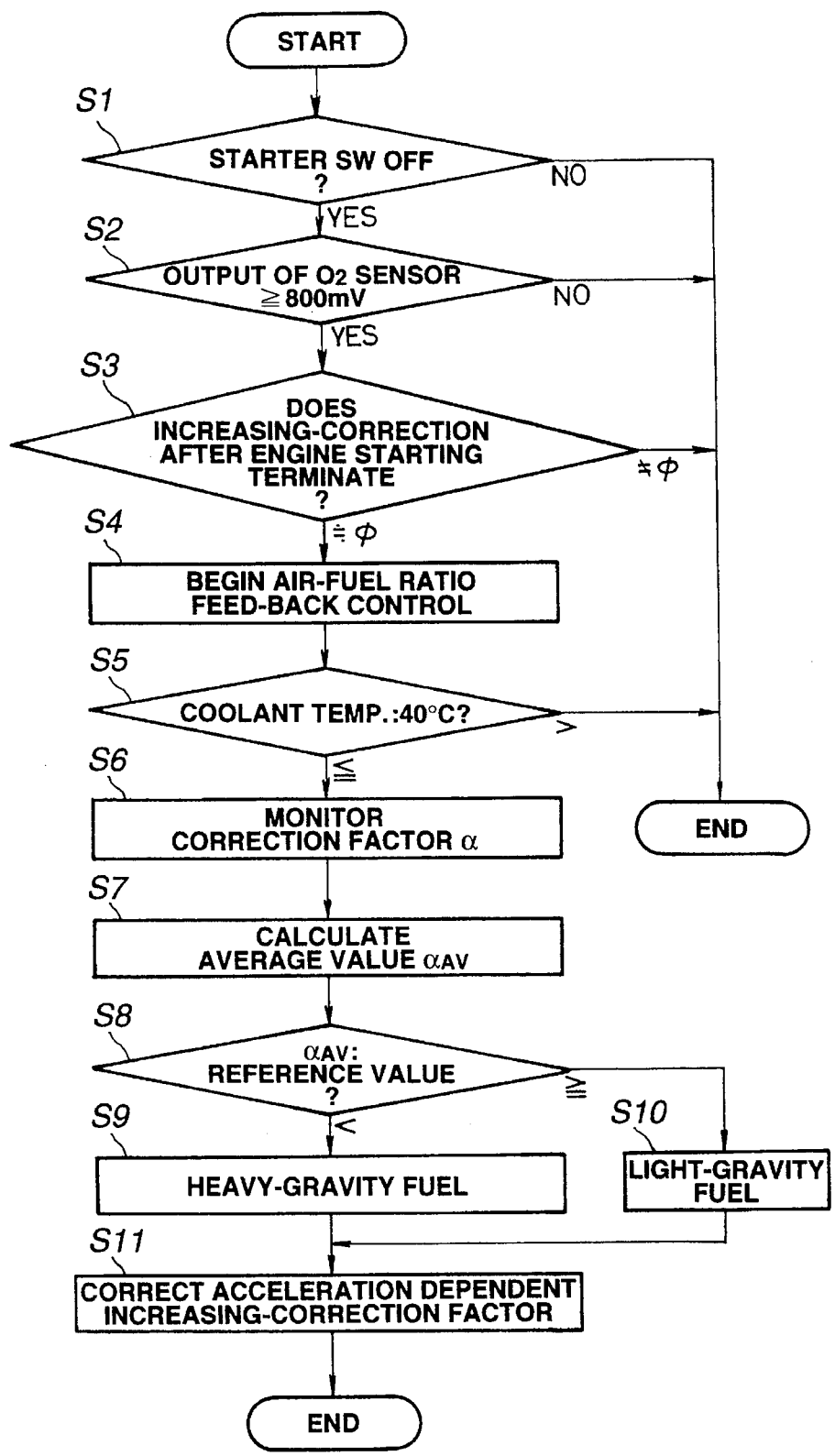
FIG. 3 is a flow chart illustrating a procedure of fuel-property detecting control of the embodiment.

As seen in the flow chart shown in FIG. 3, the control unit 12 discriminates on the basis of the air-fuel-ratio feed-back correction factor $\alpha$ as to whether the fuel supplied to the engine is heavy (less volatile) or light (more volatile). The control unit corrects the above-noted acceleration dependent correction factor on the basis of the result of the discrimination, so that the acceleration dependent correction factor conforms to the fuel volatility at real time.

In the shown embodiment, as appreciated from the flow chart shown in FIG. 3, the functions performed by the air-fuel-ratio feed-back control means 102 and the fuel-property discrimination means 105 are achieved by the software for the control unit 12. In the embodiment, the function of the low exhaust-temperature state detection means 104 is achieved by way of the water temperature sensor 15 and by the software (See the flow chart shown in FIG. 3) for the control unit 12.

Hereinbelow described in detail is the control procedure indicated by the flow chart of FIG. 3. In step 1 (represented as S1 in the flow chart), a test is made to determine whether the position of a starter switch (not shown) connected to a starter motor (not shown) is an ON position or an OFF position. If the starter switch is turned ON and thus the engine is cranking and thereafter the starter switch is turned OFF again, it means that the engine 1 starts. Thereafter, step 2 proceeds.

In step 2, on the basis of the level of the voltage signal from the $O_2$ sensor, a determination is made as to whether or not the $O_2$ sensor 16 is activated. Generally, when the $O_2$ sensor 16 is in its de-activated state, the sensor tends to output a lower electromotive force than that output in case of a richer air-fuel ratio (an electromotive force obtained in case of a lower concentration of oxygen) than a stoichiometric air-fuel ratio. As is generally known, during the fuel-injection increasing-correction performed just after the engine starting, the air-fuel ratio is richer than the stoichiometric air-fuel ratio, for the purpose of improvement of cold-engine operation. Thus, a determination can be made as to whether an activation temperature for the $O_2$ sensor 16 has been reached, by determining whether the voltage signal output from the $O_2$ sensor 16 just after the engine starts, is greater than or equal to a predetermined electromotive force (for example 800 mV) correlated with a predetermined air-fuel-mixture ratio.

When the answer to step 2 is affirmative, i.e., the $O_2$ sensor 16 is in the activated state, step 3 proceeds in which a determination is made as to whether or not the engine-starting dependent increasing-correction terminates. In the case that the correction amount of fuel-injection based on the engine-starting dependent increasing-correction becomes substantially zero, step 4 proceeds. That is, after verification of termination of the engine-starting dependent increasing-correction through step 3, the procedure goes to step 4. In step 4, the air-fuel ratio feed-back control based on the output signal from the $O_2$ sensor 16 begins, such that the air-fuel ratio of the air-fuel mixture introduced into the engine is converged toward the stoichiometric air-fuel ratio. Actually, the output signal value of the $O_2$ sensor 16 is compared with a predetermined slice level corresponding to the stoichiometric air-fuel ratio, and additionally the air-fuel-ratio feed-back correction factor $\alpha$ is derived by way of the proportional integral control based on inversion from the rich air-fuel-mixture ratio side to the lean air-fuel-mixture ratio side and vice versa. As previously described, the fuel-injection amount Ti for the fuel-injection valve 6 is calculated on the basis of the air-fuel-ratio feed-back correction factor $\alpha$.

In the subsequent step 5, a determination is made as to whether or not the engine coolant temperature Tw detected by the coolant temperature sensor 15 is less than or equal to a predetermined temperature (for example 40° C.).

The determination for the coolant temperature Tw through step 5 is provided for indirectly detecting as to whether or not the exhaust temperature is less than or equal to a predetermined temperature. In other words, a low exhaust-temperature state is indirectly determined on the basis of a predetermined correlation of the exhaust temperature with the coolant temperature Tw. Instead thereof, a sensor which directly detects an exhaust temperature, may be provided to determine as to whether or not the exhaust temperature detected by the sensor is below the predetermined temperature.

When the answer to step 5 is affirmative, then it means that the coolant temperature Tw serving as a parameter representative of the exhaust temperature is below the predetermined temperature, step 6 enters for the purpose of detection of the fuel property.

In step 6, variations in the air-fuel-ratio feed-back correction factor α are monitored. In step 7, an average value $\alpha_{av}$ of the air-fuel-ratio feed-back correction factor α is calculated on the basis of the monitored data through step 6. The air-fuel-ratio feed-back correction factor α varies in such a manner as to repetitively increase and decrease. For example, maximal and minimal values of the air-fuel-ratio feed-back correction factor are successively read into, so as to derive their moving average, and thus the average value $\alpha_{av}$ may be derived as such a moving average.

It is preferable to execute the calculation of the average value $\alpha_{av}$ in step 7 when the feed-back control state is stable after a predetermined delay time has been elapsed from the time when the air-fuel-ratio feed-back control begins in step 4.

After completion of calculation of the average value $\alpha_{av}$ of the air-fuel-ratio feed-back correction factor α, step 8 proceeds in which the calculated average value $\alpha_{av}$ is compared with a preselected reference value (for example 0.9). When the average value $\alpha_{av}$ is less than the reference value, step 9 proceeds in which the control unit discriminates that the current fuel is a heavy-gravity fuel of a low volatility (a fuel of a bad volatility). In contrast, when the average value $\alpha_{av}$ is greater than or equal to the reference value, step 10 proceeds in which the control unit discriminates that the current fuel is a light-gravity fuel of a high volatility (a fuel of a good volatility).

In the shown embodiment, the fuel volatility is discriminated between the two volatilities, namely high and low volatilities, on the basis of the level of the air-fuel-ratio feed-back correction factor α in the low exhaust-temperature state. It should be understood that the present invention is not limited to the discrimination between the two kinds of volatilities, but that the fuel volatility may be classified into more groups by providing a plurality of reference values and by comparing the average value $\alpha_{av}$ with each reference value.

The previously-described fuel-volatility discrimination based on the air-fuel-ratio feed-back correction factor α is based on the following principle.

The characteristic of the concentration of oxygen detected by the $O_2$ sensor 16 varies owing to the concentration of unburned hydrocarbons (HC). In case that there are great amounts of hydrocarbons (HC) in the atmosphere in the vicinity of the sensor 16, there is a tendency for a richer zone (a lower concentration of oxygen) of the air-fuel ratio to become increased by way of consumption of oxygen due to oxidation reaction of hydrocarbons (HC). In the case of great amounts of hydrocarbons HC, if the air-fuel-ratio feed-back control based on the output from the $O_2$ sensor 16 is achieved for the purpose of producing a stoichiometric mixture of the stoichiometric air-fuel ratio, the control point shifts to a leaner air-fuel-mixture ratio side (to the direction of decrease in the correction factor α), as compared with less amounts of hydrocarbons (HC).

Figure 4:
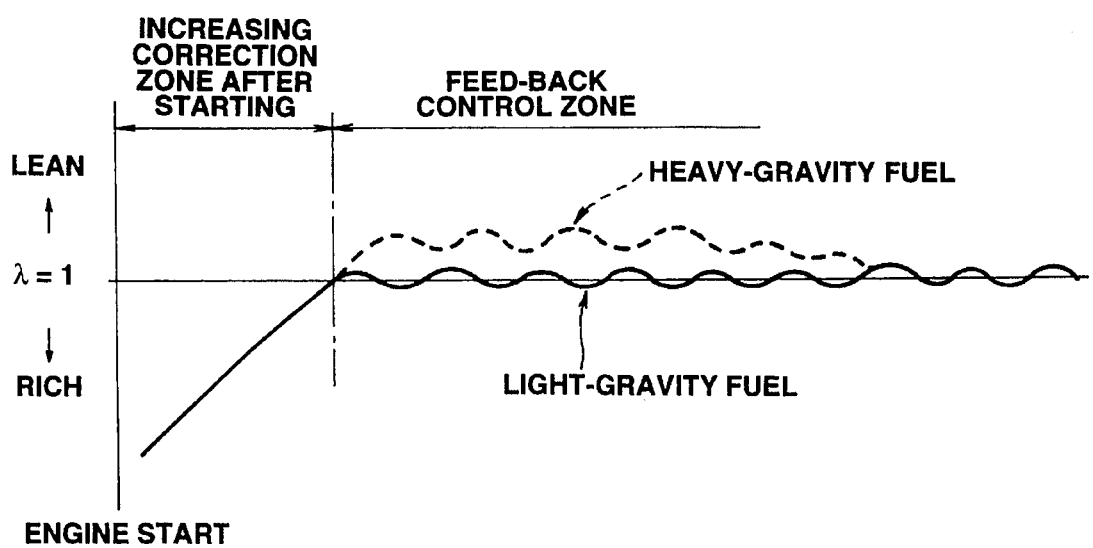
FIG. 4 is a time chart illustrating the difference of variations in an air-fuel-ratio feed-back correction factor $\alpha$ in case of both a heavy-gravity fuel and a light-gravity fuel.

On the other hand, the amount of hydrocarbons (HC) contained in exhaust gases discharged from the combustion chambers increases, as the fuel volatility deteriorates. Therefore, as shown in FIG. 4, the control point of the air-fuel-ratio feed-back control tends to be shifted to the leaner side, as the volatility deteriorates. Since the shift of the control point to the leaner side correlates with the decrease in the correction factor α, the amount of hydrocarbons HC, i.e., the fuel volatility can be estimated on the basis of the level of the correction factor α.

However, under a condition of a high exhaust-temperature, since combustion of hydrocarbons (HC) tends to be promoted in the exhaust system, the fuel volatility variations cannot be remarkably indicated by variations in the amount of hydrocarbons HC in the atmosphere in the vicinity of the sensor 16, and thus the variations in the fuel volatility cannot be remarkably indicated by the level of the correction factor α. For the above-noted reasons, the detection of the fuel volatility based on the air-fuel-ratio feed-back correction factor α is made in the low exhaust-temperature state.

In the above-explained manner, after the determination is made as to whether the fuel is heavy or light, step 11 proceeds in which a correction coefficient such as the acceleration dependent increasing-correction factor is corrected in accordance with the discrimination of the fuel volatility (the heavy-gravity or the light-gravity). In case that the fuel is a heavy-gravity fuel of a relatively low volatility, the increasing-correction requirement during acceleration is great, and as a consequence the increasing-correction of fuel-injection must be achieved to a great degree. In case that the fuel is a light-gravity fuel of a relatively high volatility, the requirement for the acceleration dependent increasing-correction is less, and thus a desired acceleration performance may be insured with a slight increment of fuel.

The initial value of the above-mentioned acceleration dependent increasing-correction factor is set to conform to a heavy-gravity fuel. Thus, in case that a light-gravity fuel is concluded through step 10, the degree of the increasing-correction of fuel-injection amount is decreasingly corrected through step 11, so that the acceleration dependent increasing-correction factor conforms to the light-gravity fuel. Such a decreasing correction prevents an excessive increasing-correction, which will occur during acceleration, even when a light-gravity fuel of a comparatively high volatility is used, thereby improving exhaust-emission control characteristics during acceleration.

According to the invention, the air-fuel-ratio feed-back control begins at the time when the engine-starting dependent increasing-correction terminates, and thus the fuel volatility can be detected based on the correction factor α even during the feed-back control. Therefore, the air-fuel-ratio feed-back control can be started immediately after the engine starts, and also the detection of the fuel volatility can be made soon, and whereby air-polluting exhaust emissions can be reduced just after engine starting.

In the shown embodiment, the average value $\alpha_{av}$ of the correction factor α is compared with the preset reference value. Alternatively, it may be preferable that the average value $\alpha_{av}$ of the correction factor α is calculated in a high exhaust-temperature state in which the fuel volatility (the heavier gravity or the lighter gravity) scarcely reflect on the level of the correction factor α, and the average value $\alpha_{av}$ is memorized as a learnt average value, and then the reference value is determined based on the learnt average value. The above-noted modification can prevent factors except the fuel volatility from having a bad influence on the detected level the air-fuel-ratio feed-back correction factor α. That is to say, even when there are fluctuations in the detected level of the correction factor α owing to qualitative irregularity of parts, regardless of the fuel volatility, the fuel property (the fuel volatility) can be accurately detected, irrespective of qualitative irregularity of parts.

Industrial Applicability

As set forth above, in an air-fuel-ratio control system for an internal combustion engine, the fuel-property detecting apparatus made according to the present invention is useful for the purpose of accurately executing a control based on a fuel volatility. Also, the apparatus of the invention is useful for an exhaust emission control system for an internal combustion engine.

I claim:

1. A fuel-property detecting apparatus for an internal combustion engine comprising:

oxygen-concentration detection means for detecting a concentration of oxygen in exhaust gases discharged from the engine;

air-fuel-ratio feed-back control means for deriving an air-fuel ratio of air-fuel mixture introduced into the engine, on the basis of said concentration of oxygen detected by said oxygen-concentration detection means, and for setting an air-fuel-ratio feed-back correction factor so that the derived air-fuel ratio is adjusted to a target air-fuel ratio, and for correcting a fuel-supply amount from a fuel-supply means in accordance with said air-fuel-ratio feed-back correction factor;

low exhaust-temperature state detection means for detecting whether an exhaust-temperature of the engine is in a predetermined low exhaust-temperature state; and fuel-property discrimination means for discriminating a volatility of fuel supplied to the engine on the basis of said air-fuel-ratio feed-back correction factor set by said air-fuel-ratio feed-back control means, when detecting said predetermined low exhaust-temperature state by said low exhaust-temperature state detection means.

2. A fuel-property detecting apparatus for an internal combustion engine, as set forth in claim 1, wherein said fuel-property discrimination means discriminates the volatility of fuel supplied to the engine between two volatilities, namely high and low volatilities, by comparing said air-fuel-ratio feed-back correction factor with said predetermined reference value.

3. A fuel-property detecting apparatus for an internal combustion engine, as set forth in claim 1, wherein said fuel-property discrimination means includes means for calculating an average value of said air-fuel-ratio feed-back correction factor, and said fuel-property discrimination means discriminates the fuel volatility on the basis of said average value.

4. A fuel-property detecting apparatus for an internal combustion engine, as set forth in claim 3, which further comprises means for learning an average value of said air-fuel-ratio feed-back correction factor under a condition in which the exhaust-temperature of the engine is high, and means for setting a reference value for discrimination of the fuel volatility on the basis of a learnt average value produced by said learning means.

5. A fuel-property detecting apparatus for an internal combustion engine, as set forth in claim 1, which further comprises means for correcting an increasing-correction amount, which amount is added to a reference fuel-supply amount to optimize an air-fuel ratio during transition of engine operation, on the basis of the fuel volatility discriminated by said fuel-property discrimination means.

6. A fuel-property detecting method for an internal combustion engine, comprising the steps of:

detecting a concentration of oxygen in exhaust gases discharged from the engine;

setting an air-fuel-ratio feed-back correction factor based on the detected concentration of oxygen, so that an air-fuel ratio of air-fuel mixture introduced into the engine is adjusted to a target air-fuel ratio;

feed-back controlling a fuel-supply amount of the engine in accordance with said air-fuel-ratio feed-back correction factor;

detecting as to whether an exhaust-temperature of the engine is in a predetermined low exhaust-temperature state;

deriving an average value of said air-fuel-ratio feed-back correction factor when detecting said predetermined low exhaust-temperature state; and discriminating a volatility of fuel supplied to the engine on the basis of said average value of said air-fuel-ratio feed-back correction factor.

* * * * *